US011712996B2

(12) United States Patent
Atsumi

(10) Patent No.: US 11,712,996 B2
(45) Date of Patent: Aug. 1, 2023

(54) SOUND-PRODUCING DEVICE FOR VEHICLE

(71) Applicant: HONDA MOTOR CO., LTD., Tokyo (JP)

(72) Inventor: Yukiya Atsumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 290 days.

(21) Appl. No.: 17/058,409

(22) PCT Filed: Jun. 4, 2018

(86) PCT No.: PCT/JP2018/021366
§ 371 (c)(1),
(2) Date: Nov. 24, 2020

(87) PCT Pub. No.: WO2019/234792
PCT Pub. Date: Dec. 12, 2019

(65) Prior Publication Data
US 2021/0197717 A1    Jul. 1, 2021

(51) Int. Cl.
*B60Q 5/00* (2006.01)
*G10K 15/04* (2006.01)
*H04R 1/02* (2006.01)

(52) U.S. Cl.
CPC ............. *B60Q 5/008* (2013.01); *G10K 15/04* (2013.01); *H04R 1/025* (2013.01); *H04R 2499/13* (2013.01)

(58) Field of Classification Search
CPC . B60Q 1/00; B60Q 5/00; B60Q 5/008; G10K 15/04; H04R 1/02

(Continued)

(56) References Cited

U.S. PATENT DOCUMENTS

2010/0245069 A1*  9/2010  Noro ................. B60Q 5/008
                                                        340/441
2012/0182137 A1   7/2012  Nakayama et al.

FOREIGN PATENT DOCUMENTS

CN          102611958 A      7/2012
FR             430355 A      10/1911
(Continued)

OTHER PUBLICATIONS

Office Action dated Mar. 15, 2023, issued in the corresponding Chinese Patent Application No. 201880094334.6 with the English translation thereof.

*Primary Examiner* — Yosef K Laekemariam
(74) *Attorney, Agent, or Firm* — Carrier, Shende & Associates, P.C.; Joseph P. Carrier; Fulchand P. Shende

(57) ABSTRACT

A sound-producing device for a vehicle includes sound-producing means, an opening provided in a vehicle body bottom part, and a duct connecting the sound-producing means to the opening, and it is possible, by amplifying the sound pressure of a sound generated by the sound-producing means through the duct and transmitting the sound to the outside of the vehicle via the opening of the vehicle body bottom part, to inform a pedestrian that the vehicle is approaching and alert them, and to reduce the sound pressure of the sound-producing means compared with a case in which there is no duct. Moreover, since an inlet and an outlet of the duct are offset from each other in a direction that intersects a vertical axis, it is possible to prevent water or small stones scattered by a tire from passing through the duct and to decrease the stiffness of the duct.

16 Claims, 7 Drawing Sheets

(58) Field of Classification Search
USPC .......................... 381/86, 302, 332, 365, 389
See application file for complete search history.

(56) References Cited

FOREIGN PATENT DOCUMENTS

| | | | |
|---|---|---|---|
| JP | S61-98647 U | 6/1986 | |
| JP | 2010-228564 A | 10/2010 | |
| JP | 2011-189906 A | 9/2011 | |
| JP | 2011-235774 A | 11/2011 | |
| JP | 2011235774 | * 11/2011 | ............... B60Q 5/00 |

* cited by examiner

SOUND-PRODUCING DEVICE FOR VEHICLE

TECHNICAL FIELD

The present invention relates to a sound-producing device for a vehicle that includes sound-producing means, an opening provided in a vehicle body bottom part, and a duct connecting the sound-producing means to the opening.

BACKGROUND ART

When an electric vehicle or a hybrid vehicle travels with an electric motor at low speed, there is the problem that due to the sound of traveling being small it is difficult for a pedestrian to notice the vehicle approaching. An arrangement in which a speaker generating a simulated travel sound is mounted on a vehicle body frame, and this speaker and an opening provided in a vehicle body undercover are connected via a duct that increases in diameter in going downward, thus efficiently transmitting the simulated travel sound generated by the speaker to the outside of the vehicle, is known from Patent Document 1 below.

PRIOR ART DOCUMENTS

Patent Documents

Patent Document 1: Japanese Patent Application Laid-open No. 2011-235774

SUMMARY OF THE INVENTION

Problems to be Solved by the Invention

In the above conventional arrangement, since the duct extends downward from the speaker straight to the opening of the vehicle body undercover, there is a possibility that water or small stones scattered up from the road surface by a tire will reach the speaker via the duct, and a malfunction of the speaker will be caused by the water or small stones.

The present invention has been accomplished in light of the above circumstances, and it is an object thereof to protect sound-producing means that generates a sound for informing a pedestrian, etc. of the approach of a vehicle from water or scattered stones with a simple structure.

Means for Solving the Problems

In order to attain the above object, there is provided a sound-producing device for a vehicle comprising sound-producing means, an opening provided in a vehicle body bottom part, and a duct connecting the sound-producing means to the opening, wherein the duct includes an inlet connected to the sound-producing means, an outlet connected to the opening, and a duct main body providing a connection between the inlet and the outlet, and the inlet and the outlet are offset in a direction that intersects a vertical axis.

Further, according to a second aspect of the present invention, in addition to the first aspect, the sound-producing means is fixed to a bracket mounted on a vehicle body, and the duct is fixed to the bracket.

Furthermore, according to a third aspect of the present invention, in addition to the first or second aspect, the duct main body comprises an impact-absorbing portion.

Moreover, according to a fourth aspect of the present invention, in addition to any one of the first to third aspects, the outlet has a larger diameter than a diameter of the inlet.

Further, according to a fifth aspect of the present invention, in addition to any one of the first to fourth aspects, the duct main body is formed from a flexible material.

Furthermore, according to a sixth aspect of the present invention, in addition to anyone of the first to fifth aspects, the inlet is formed from a hard resin material.

Moreover, according to a seventh aspect of the present invention, in addition to anyone of the first to sixth aspects, a lower end of the outlet is formed so as to be flush with the opening.

Further, according to an eighth aspect of the present invention, in addition to the third aspect, the impact-absorbing part is a groove portion formed in the duct main body in a direction that intersects the vertical axis.

Furthermore, according to a ninth aspect of the present invention, in addition to the third aspect, the impact-absorbing part is a bellows portion formed in the duct main body.

Moreover, according to a tenth aspect of the present invention, in addition to any one of the first to ninth aspects, the sound-producing device comprises fastening means that fixes the inlet to the vehicle body bottom part.

An undercover part 14 of an embodiment corresponds to the vehicle body bottom part of the present invention, a speaker 17 of the embodiment corresponds to the sound-producing means of the present invention, a clip 24 of the embodiment corresponds to the fastening means of the present invention, and groove portions 25a and 25b and a bellows portion 25c of the embodiment correspond to the impact-absorbing part of the present invention.

Effects of the Invention

In accordance with the first aspect of the present invention, since the sound-producing device for a vehicle includes the sound-producing means, the opening provided in the vehicle body bottom part, and the duct connecting the sound-producing means to the opening, when a vehicle with a small travel sound is traveling, not only is it possible, by amplifying the sound pressure of a sound generated by the sound-producing means by means of the duct and transmitting the sound to the outside of the vehicle via the opening of the vehicle body bottom part, to inform a pedestrian that the vehicle is approaching and alert them, but it is also possible to reduce the sound pressure of the sound-producing means compared with a case in which there is no duct, thus improving the NV performance within the vehicle compartment. Moreover, since the inlet and the outlet of the duct are offset from each other in a direction that intersects the vertical axis, not only is it possible to prevent water or small stones scattered by a tire from passing through the duct and making the sound-producing means become wet or be damaged, but it is also possible to decrease the stiffness of the duct and make it difficult for vibration or an impact inputted into the vehicle body bottom part to be transmitted to the sound-producing means via the duct.

Furthermore, in accordance with the second aspect of the present invention, since the duct is fixed to the bracket attached to the vehicle body, compared with a case in which the duct is fixed directly to the sound-producing means, it is possible to prevent the sound-producing means and the duct from interfering with each other and enhance the mounting precision, and it is also possible to suppress transmission to the sound-producing means of vibration that has been transmitted from the vehicle body bottom part to the duct.

Moreover, in accordance with the third aspect of the present invention, since the duct main body includes the impact-absorbing part, it is possible to decrease the stiffness of the duct by means of the impact-absorbing part and prevent yet more effectively the transmission of vibration or an impact to the sound-producing means.

Furthermore, in accordance with the fourth aspect of the present invention, since the outlet has a larger diameter than that of the inlet, it is possible to amplify effectively the sound pressure of a sound generated by the sound-producing means by means of the duct.

Moreover, in accordance with the fifth aspect of the present invention, since the duct main body is formed from a flexible material, it is possible to decrease the stiffness of the duct and prevent yet more effectively the transmission of vibration or an impact to the sound-producing means.

Furthermore, in accordance with the sixth aspect of the present invention, since the inlet is made of a hard resin material, not only is it possible to strongly fix the duct to the bracket, but it is also possible to prevent the inlet from being deformed and coming into contact with the sound-producing means even when the inlet and the sound-producing means are disposed close to each other, and it is therefore possible to suppress the transmission of vibration from the inlet to the sound-producing means while suppressing the leakage of sound via a gap between the inlet and the sound-producing means.

Moreover, in accordance with the seventh aspect of the present invention, since the lower end of the outlet is formed so as to be flush with the opening, it is possible to prevent wind noise from being generated by the air flow of the vehicle.

Furthermore, in accordance with the eighth aspect of the present invention, since the impact-absorbing part is the groove portion formed in the duct main body in a direction that intersects the vertical axis, it is possible to decrease effectively the stiffness of the duct by means of the groove portion, thereby enhancing the effect in preventing vibration or an impact from being transmitted.

Moreover, in accordance with the ninth aspect of the present invention, since the impact-absorbing part is the bellows portion formed in the duct main body, it is possible to decrease effectively the stiffness of the duct by means of the bellows portion, thereby enhancing the effect in preventing vibration or an impact from being transmitted.

Furthermore, in accordance with the tenth aspect of the present invention, since it includes the fastening means, which fixes the inlet to the vehicle body bottom part, supporting a component such as an inner tender or an undercover of the vehicle body bottom part by means of the duct makes it possible to prevent the component from sagging.

EXPLANATION OF REFERENCE NUMERALS AND SYMBOLS

14 Undercover part (vehicle body bottom part)
14a Opening
16 Bracket
17 Speaker (sound-producing means)
20 Duct
21 Inlet
22 Outlet
24 Clip (fastening means)
25 Duct main body
25a Groove portion (impact-absorbing part)
25b Groove portion (impact-absorbing part)
25c Bellows portion (impact-absorbing part)
L Vertical axis

MODES FOR CARRYING OUT THE INVENTION

Embodiments of the present invention are explained below by reference to the attached drawings.

First Embodiment

First, a first embodiment of the present invention is explained by reference to FIG. 1 to FIG. 6.

Figure 1:
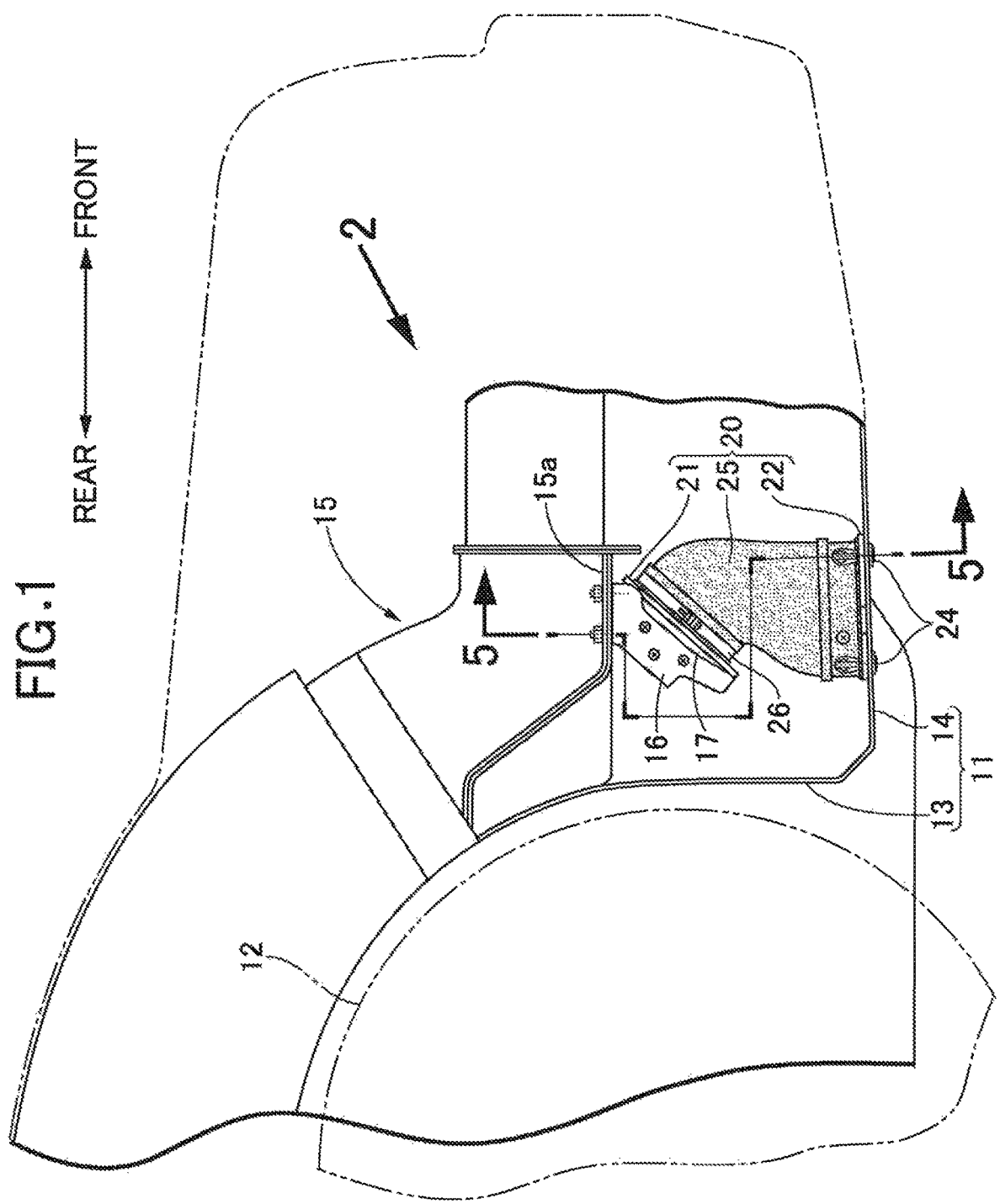
FIG. 1 is a right side view of a vehicle body front part of an electric vehicle. (first embodiment)
Figure 2:
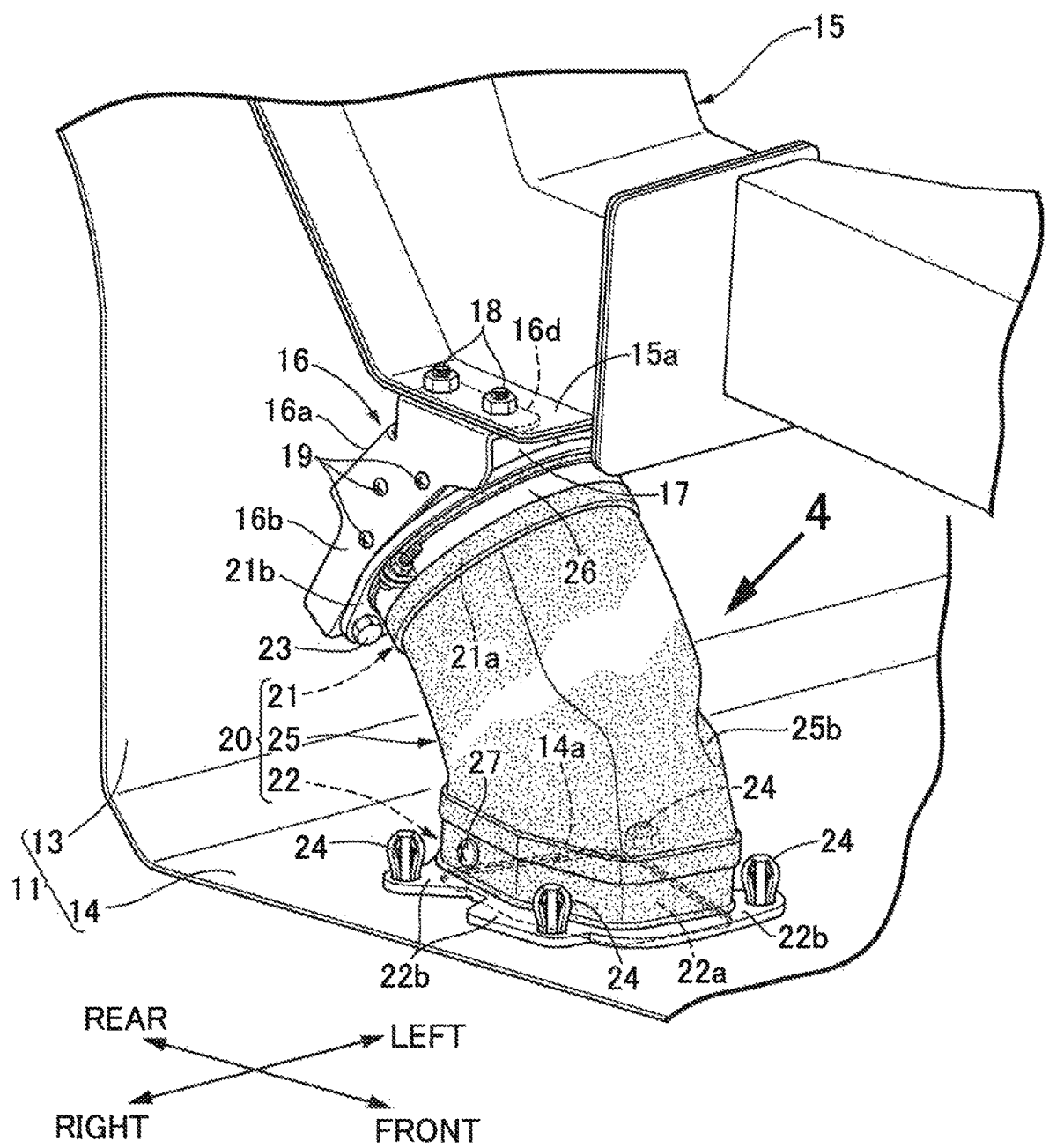
FIG. 2 is a view in the direction of arrow 2 in FIG. 1. (first embodiment)
Figure 3:
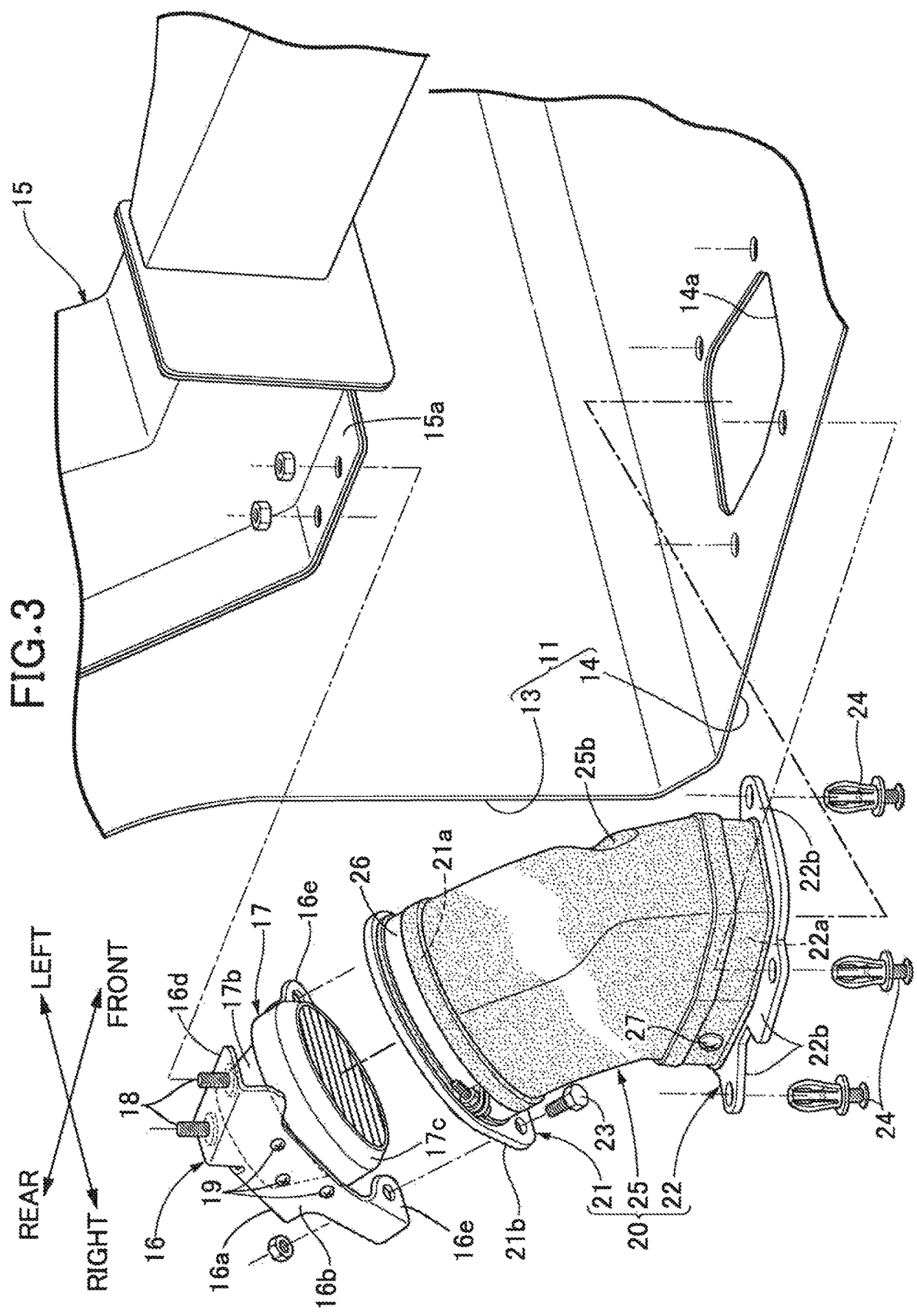
FIG. 3 is an exploded view corresponding to FIG. 2. (first embodiment)
Figure 4:
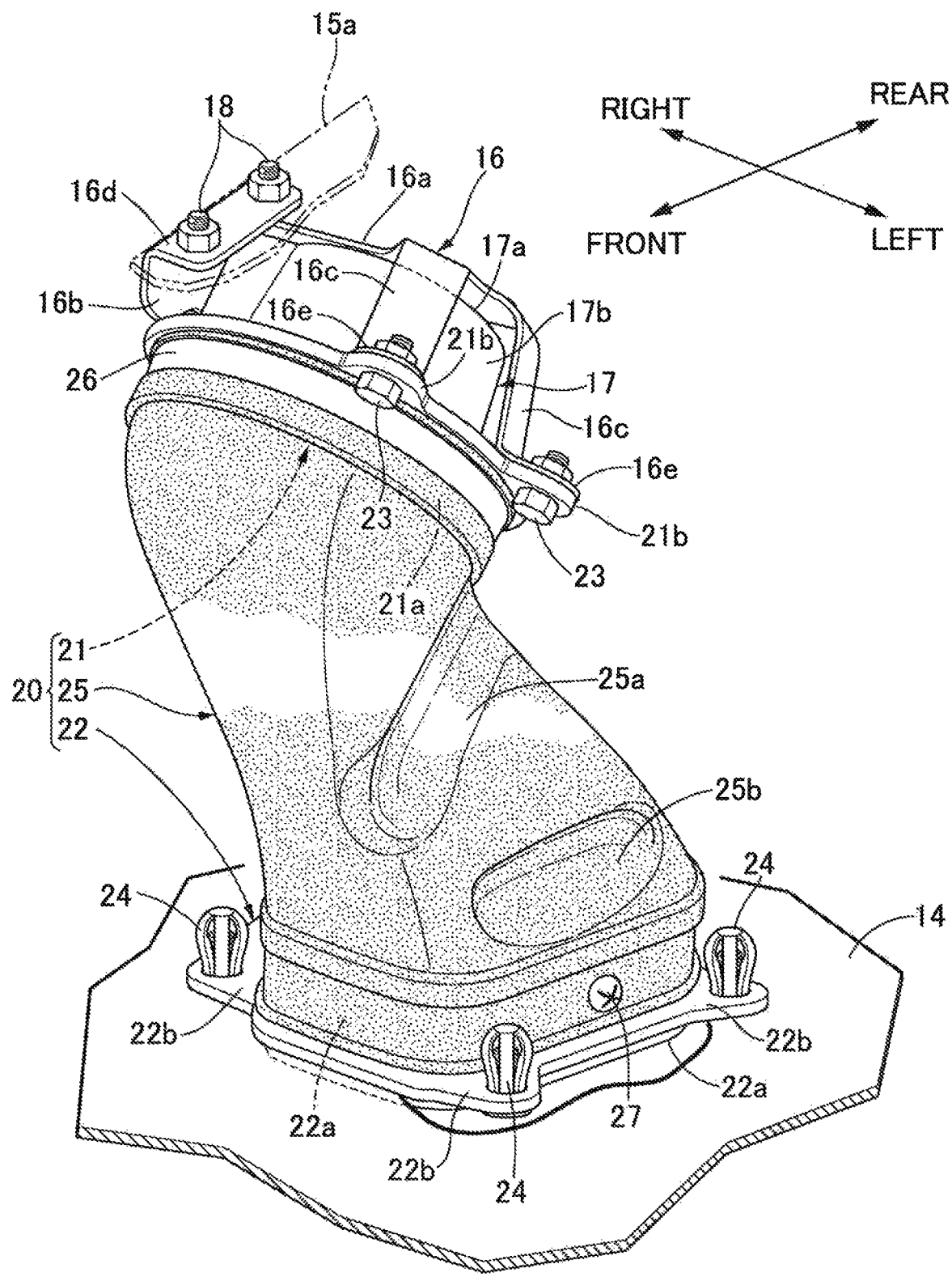
FIG. 4 is a view in the direction of arrow 4 in FIG. 2. (first embodiment)

As shown in FIG. 1, a front fender inner 11 disposed in a vehicle body front part of an electric vehicle that does not include a gasoline engine and travels with the driving force of an electric motor includes a fender main body part 13 covering the front of a right front wheel 12, and an undercover part 14 extending forward from the lower front end of the fender main body part 13. A vehicle body frame 15 having a hollow closed cross-section is disposed above the front fender inner 11, and a speaker 17 is mounted on a lower face of the vehicle body frame 15 via a bracket 16.

As shown in FIG. 2 to FIG. 6, the bracket 16, which is formed by press forming a metal plate, includes a flat bottom wall portion 16a, a side wall portion 16b formed by downwardly bending a right end part of the bottom wall portion 16a, two leg portions 16c formed by downwardly bending a left end part of the bottom wall portion 16a, and a fixed portion 16d formed by horizontally bending a front end part of the side wall portion 16b, the fixed portion 16d being fastened to a lower face of a flange 15a of the vehicle body frame 15 by means of two bolts 18.

The speaker 17, which has a short cylindrical shape, is fastened to the side wall portion 16b of the bracket 16 by means of three bolts 19 in a state in which a back face 17a thereof opposes the bottom wall portion 16a of the bracket 16 and an outer peripheral face 17b thereof is sandwiched between the side wall portion 16b and the two leg portions 16c of the bracket 16. In this state, a cone portion 17c of the speaker 17 faces obliquely downward to the front.

A duct 20 is formed from an inlet 21 and outlet 22 made of a hard synthetic resin such as polypropylene and a duct main body 25 that is made of a flexible material such as a rubber and provides a connection between the inlet 21 and the outlet 22.

The inlet 21 includes a circular cross-section tubular portion 21a and three flange portions 21b projectingly provided on an outer peripheral part of the upper end of the tubular portion 21a, these three flange portions 21b being superimposed on three flange portions 16e provided at lower ends of the side wall portion 16b and the two leg portions 16c of the bracket 16 and fastened by means of three bolts 23. In this state, the inlet 21 of the duct 20 abuts against only the bracket 16 and does not abut against the speaker 17.

The outlet 22 includes a substantially pentagonal cross-section tubular portion 22a, four flange portions 22b projectingly provided on an outer peripheral part of the lower end of the tubular portion 22a, and a lattice portion 22c (see FIG. 6) partitioning the interior of the tubular portion 22a into a plurality of narrow passages. These four flange portions 22b are superimposed on the periphery of an opening 14a formed in the undercover part 14 of the front fender inner 11 and fastened by means of four clips 24. In this state, the lower end of the outlet 22 is flush with a lower face of the opening 14a of the undercover part 14 and does not protrude downward from the opening 14a of the undercover part 14.

An upper end part of the duct main body 25 is fitted onto the outer periphery of the tubular portion 21a of the inlet 21 from below and fixed and fastened by means of a fastening band 26. A lower end part of the duct main body 25 is fitted onto the outer periphery of the tubular portion 22a of the outlet 22 from above and fixed and fastened by means of two bolts 27.

Figure 5:
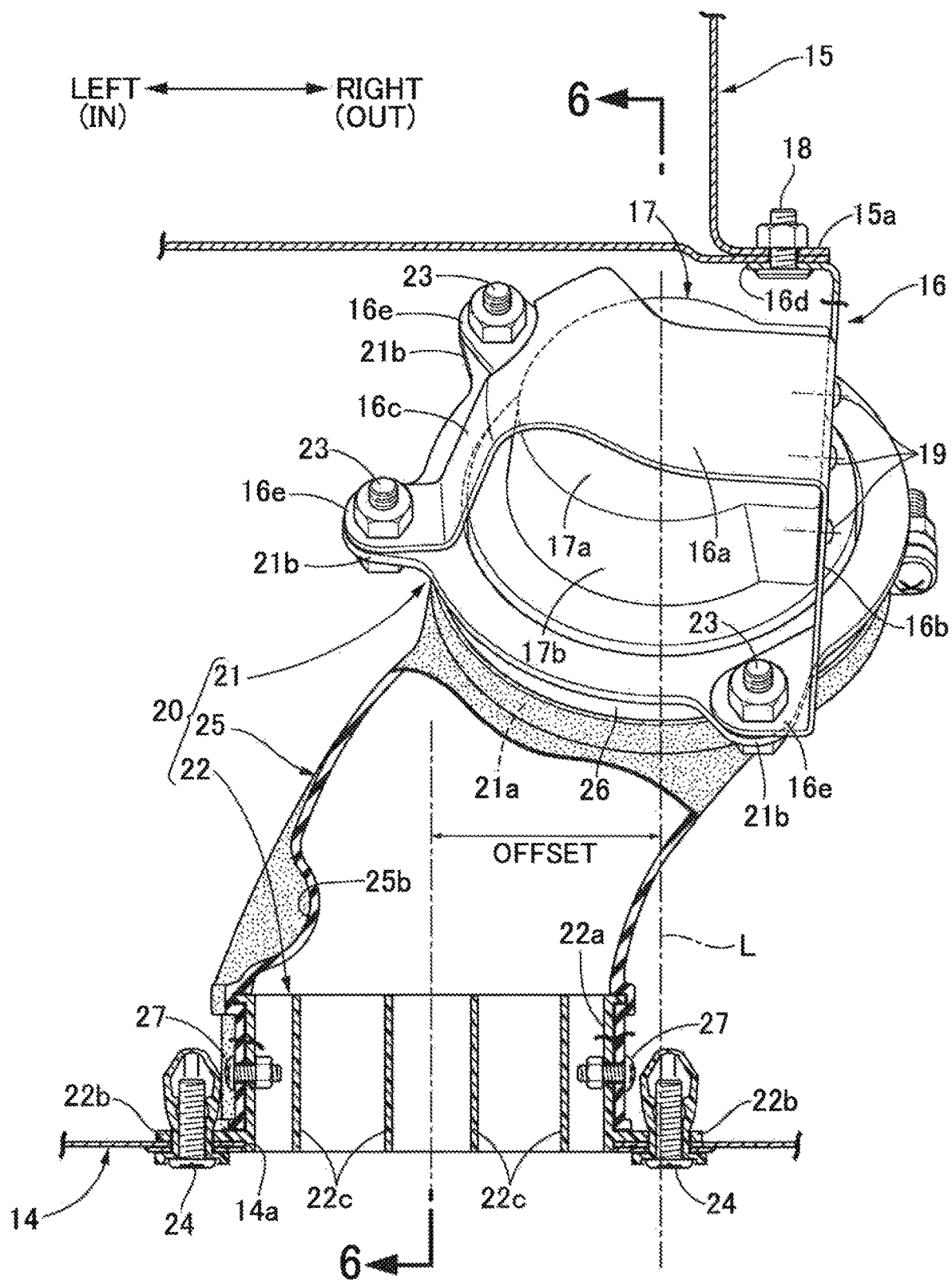
FIG. 5 is a sectional view along line 5-5 in FIG. 1. (first embodiment)
Figure 6:
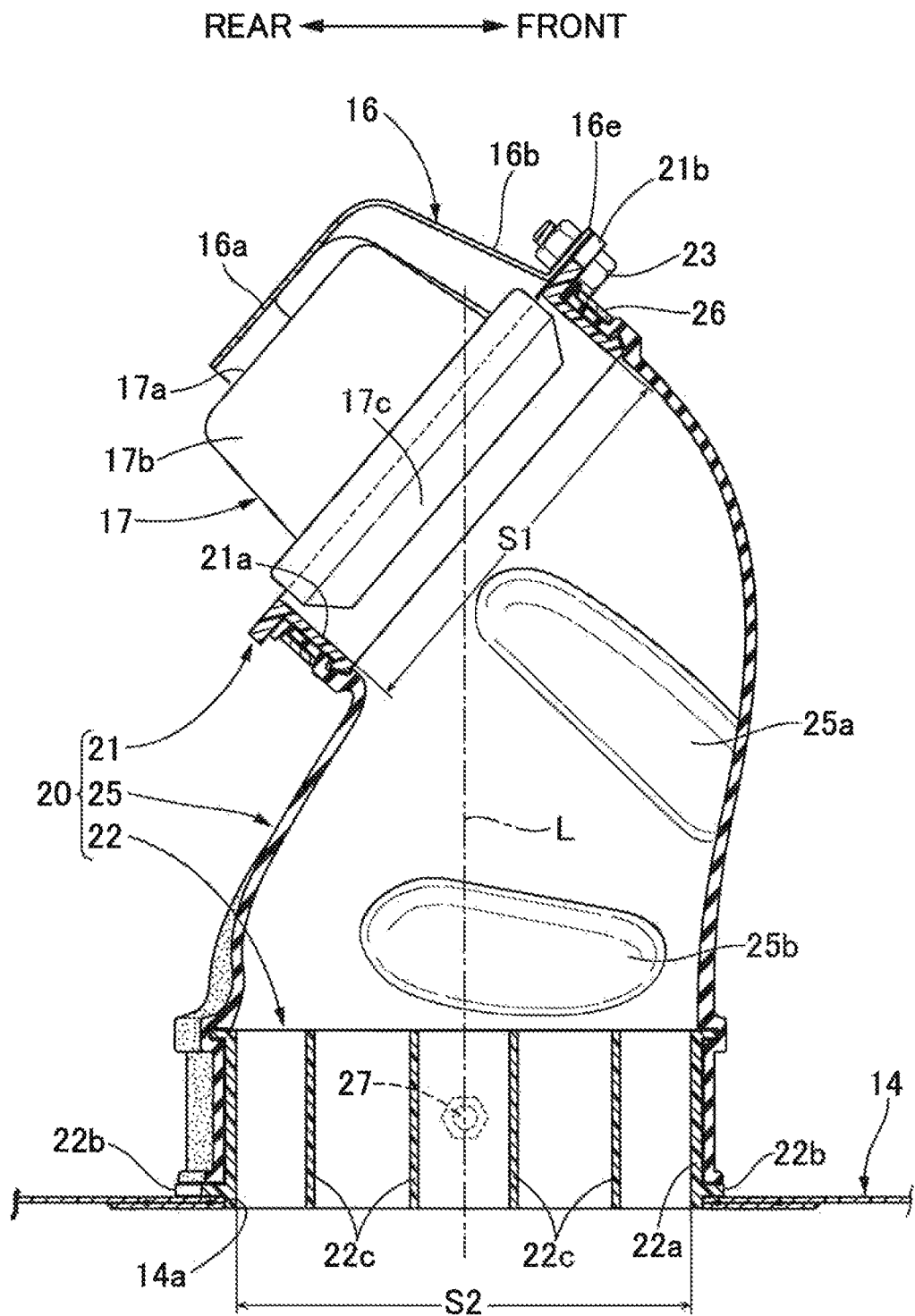
FIG. 6 is a sectional view along line 6-6 in FIG. 5. (first embodiment)

With regard to the positional relationship between the inlet 21 and the outlet 22 of the duct 20, the center of the outlet 22 is aligned in the fore-and-aft direction (see FIG. 6) with respect to a vertical axis L passing through the center of the inlet 21, but the center of the outlet 22 is offset leftward (inward in the vehicle width direction) (see FIG. 5). That is, the duct main body 25 bends leftward (inward in the vehicle width direction) from the inlet 21 toward the outlet 22.

The external diameter (cross section S2) of the outlet 22 is larger than the external diameter (cross section S) of the inlet 21 (see FIG. 6), and the cross section of the duct main body 25 increases in going from the inlet 21 toward the outlet 22. Formed in a left face (an inner face in the vehicle width direction) of the duct main body 25 are two groove portions 25a and 25b as impact-absorbing parts extending in a direction that intersects the vertical axis L. The groove portion 25a on the upper side extends so as to be inclined from upper rear to lower front, and the groove portion 25b on the lower side extends from the rear to the front.

The operation of the embodiment of the present invention having the above arrangement is now explained.

With regard to an electric vehicle equipped with an electric motor as a drive source for traveling, since the sound of traveling generated by the electric motor when traveling at a low speed is small, it is difficult for a pedestrian to notice the electric vehicle approaching, but it is possible, by the speaker 17 generating a simulated travel sound, to inform a pedestrian of the approach of the electric vehicle and alert them.

Furthermore, in order to maintain good NV (noise and vibration) performance within a vehicle compartment, it is desirable that the simulated travel sound generated by the speaker 17 is small, but if so doing the simulated travel sound transmitted to the outside of the vehicle becomes small, and there is a possibility that a pedestrian will not be able to be notified of the approach of the electric vehicle. However, in accordance with the present embodiment, since the speaker 17 and the opening 14a of the undercover part 14 are connected via the duct 20, which increases in diameter in going toward the opening 14a, even with use of the speaker 17, which does not interfere with the NV performance within the vehicle compartment, it is possible to reliably notify a pedestrian due to the duct 20 increasing the sound pressure of the simulated travel sound generated by the speaker 17.

Furthermore, when water is splashed up from the road surface by means of a tire accompanying the vehicle traveling, there is a possibility that the water will enter the interior of the duct 20 via the downwardly-opening outlet 22, thus making the speaker 17 become wet and thereby causing a malfunction. However, since the duct 20 is bent so that the outlet 22 is offset with respect to the inlet 21, it becomes difficult for the water entering the interior of the duct 20 via the outlet 22 to reach the speaker 17, thereby protecting the speaker 17 from becoming wet.

Moreover, the lattice portion 22c of the outlet 22 will interfere with a majority of the small stones scattered up from the road surface and they will not enter the interior of the duct 20, but fine stones might pass through the lattice portion 22c and enter the interior of the duct 20. However, since the bent duct 20 will interfere with small stones that have passed through the lattice portion 22c it will become difficult for them to reach the speaker 17, and it becomes possible to prevent the speaker 17 from being damaged by collision with small stones.

If the duct 20 had a shape that was not bent but straight, the stiffness of the duct 20 would increase and it would become difficult for it to be deformed in the axial direction and in a direction at right angles to the axis, and when the speaker 17 and the undercover part 14 were connected by the duct 20, there would be the problem that vibration or an impact inputted into the undercover part 14 would be transmitted to the speaker 17 via the duct 20. However, in accordance with the present embodiment, since the duct 20 is bent so that the outlet 22 is offset with respect to the inlet 21, the stiffness of the duct 20 is lowered and it is easy for it to be deformed in the axial direction and in a direction at right angles to the axis, and it becomes difficult for vibration or an impact inputted into the undercover part 14 to be transmitted to the speaker 17 via the duct 20.

Here, since the duct main body 25 is made of a rubber, which is a flexible material and, moreover, the duct main body 25 includes the impact-absorbing part formed from the groove portions 25a and 25b, it is possible to yet more effectively prevent vibration or an impact from being transmitted to the speaker 17 by decreasing the stiffness of the duct main body 25 by means of the groove portions 25a and 25b.

Furthermore, since the inlet 21 of the duct 20 is fixed to the bracket 16 attached to the vehicle body frame 15, compared with a case in which the speaker 17 is fixed to the bracket 16 and the duct 20 is fixed to the speaker 17, it is possible to prevent the speaker 17 and the duct 20 from interfering with each other, thus enhancing the mounting precision. Moreover, since the inlet 21 is made of polypropylene, which is a hard resin material, not only is it possible to strongly fix the duct 20 to the bracket 16, but it is also possible to prevent the inlet 21 from being deformed and coming into contact with the speaker 17, and it is therefore possible to suppress the transmission of vibration from the inlet 21 to the speaker 17 while suppressing leakage of sound via a gap between the inlet 21 and the speaker 17.

Furthermore, since the lower end of the outlet 22 of the duct 20 is formed so as to be flush with the opening 14a of the undercover part 14, it is possible to prevent wind noise from being generated by the air flow of the vehicle. Moreover, since the front fender inner 11 is fastened to the outlet 22 of the duct 20 with the clip 24, it is possible to prevent the front fender inner 11 from sagging.

Second Embodiment

Figure 7:
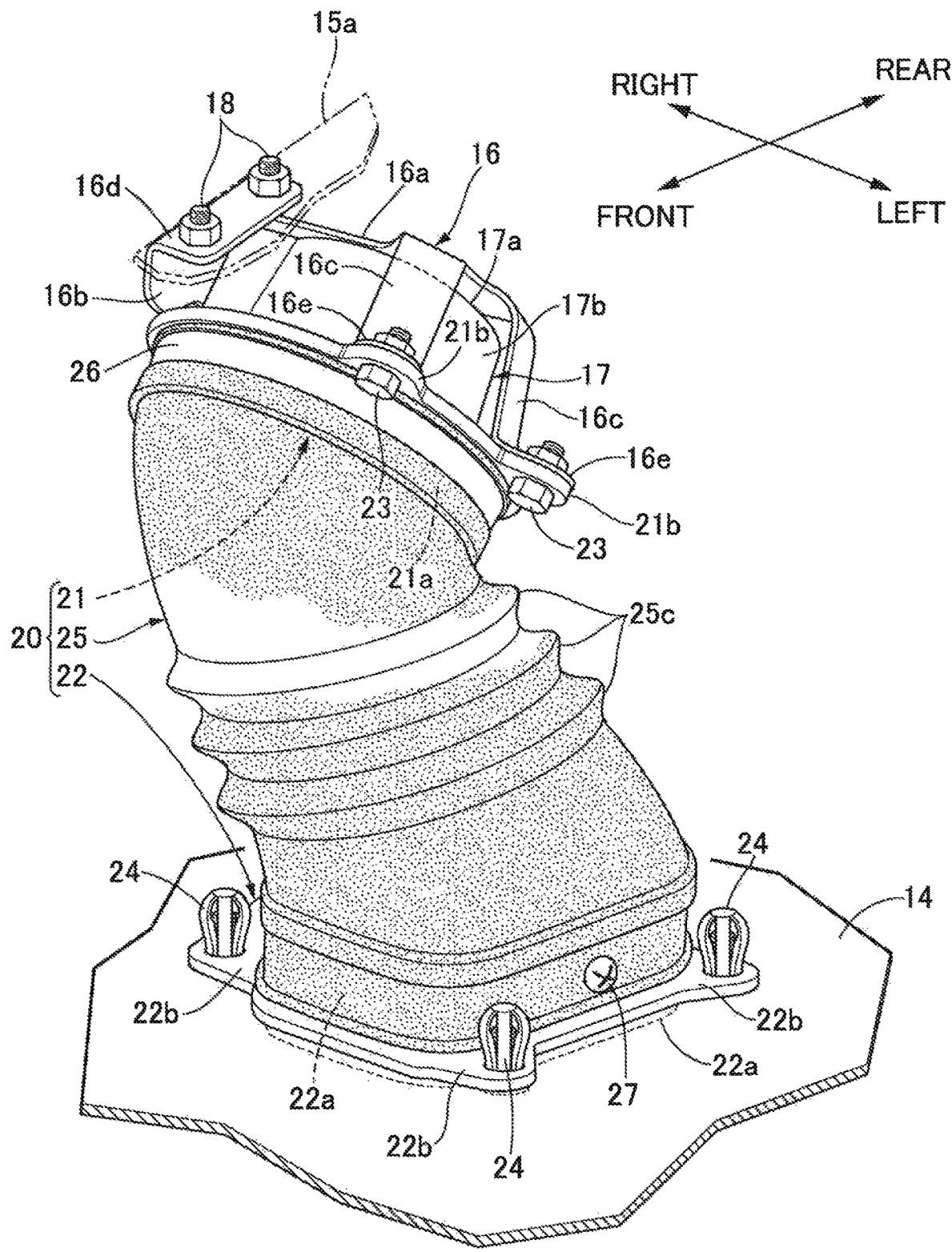
FIG. 7 is a view corresponding to FIG. 4. (second embodiment)

A second embodiment of the present invention is now explained by reference to FIG. 7.

In the first embodiment, the impact-absorbing part of the duct main body 25 is formed from the groove portions 25a and 25b, but in the second embodiment the impact-absorbing part of the duct main body 25 is formed from a bellows portion 25c. Since the bellows portion 25c can be easily deformed in the vertical direction or in the horizontal direction compared with the groove portions 25a and 25b, it is possible to decrease effectively the stiffness of the duct main body 25, further reducing the transmission of vibration or an impact from the undercover part 14 to the speaker 17.

Embodiments of the present invention are explained above, but the present invention may be modified in a variety of ways as long as the modifications do not depart from the subject matter thereof.

For example, the sound-producing means of the present invention is not limited to the speaker 17 of the embodiment, and may be one that can generate any simulated travel sound or may be one that can generate an alarm sound such as a horn.

Furthermore, the vehicle of the present invention is not limited to an electric vehicle, and may be a hybrid vehicle that includes both an engine and an electric motor as a drive source for traveling.

Moreover, the duct 20 of the embodiment is arranged so that the outlet 22 is offset inward in the vehicle width direction with respect to the inlet 21, but the direction of offset may be any orientation in the fore-and-aft direction or the vehicle width direction.

The invention claimed is:

1. A sound-producing device for a vehicle comprising a sound-producing device, an opening provided in a vehicle body bottom part, and a duct connecting the sound-producing device to the opening,
   wherein the duct includes an inlet connected to the sound-producing device, an outlet connected to the opening, and a duct main body providing a connection between the inlet and the outlet, and the inlet and the outlet are offset in a direction that intersects a vertical axis, and
   wherein the sound producing device is fixed to a bracket mounted on a vehicle body, and the duct is fixed to the bracket.

2. A sound-producing device for a vehicle comprising a sound-producing device, an opening provided in a vehicle body bottom part, and a duct connecting the sound-producing device to the opening,
   wherein the duct includes an inlet connected to the sound-producing device, an outlet connected to the opening, and a duct main body providing a connection between the inlet and the outlet, and the inlet and the outlet are offset in a direction that intersects a vertical axis, and
   wherein the duct main body comprises an impact-absorbing portion.

3. The sound-producing device for a vehicle according to claim 1, wherein the outlet has a larger diameter than a diameter of the inlet.

4. A sound-producing device for a vehicle comprising a sound-producing device, an opening provided in a vehicle body bottom part, and a duct connecting the sound-producing device to the opening,
   wherein the duct includes an inlet connected to the sound-producing device, an outlet connected to the opening, and a duct main body providing a connection between the inlet and the outlet, and the inlet and the outlet are offset in a direction that intersects a vertical axis, and
   wherein the duct main body is formed from a flexible material.

5. The sound-producing device for a vehicle according to claim 1, wherein the inlet is formed from a hard resin material.

6. The sound-producing device for a vehicle according to claim 1, wherein a lower end of the outlet is formed so as to be flush with the opening.

7. The sound-producing device for a vehicle according to claim 2, wherein the impact-absorbing portion is a groove portion formed in the duct main body in a direction that intersects the vertical axis.

8. The sound-producing device for a vehicle according to claim 2, wherein the impact-absorbing portion is a bellows portion formed in the duct main body.

9. The sound-producing device for a vehicle according to claim 1, comprising a fastening device that fixes the inlet to the vehicle body bottom part.

10. The sound-producing device for a vehicle according to claim 2, comprising a fastening device that fixes the inlet to the vehicle body bottom part.

11. The sound-producing device for a vehicle according to claim 3, comprising a fastening device that fixes the inlet to the vehicle body bottom part.

12. The sound-producing device for a vehicle according to claim 4, comprising a fastening device that fixes the inlet to the vehicle body bottom part.

13. The sound-producing device for a vehicle according to claim 5, comprising a fastening device that fixes the inlet to the vehicle body bottom part.

14. The sound-producing device for a vehicle according to claim 6, comprising a fastening device that fixes the inlet to the vehicle body bottom part.

15. The sound-producing device for a vehicle according to claim 7, comprising a fastening device that fixes the inlet to the vehicle body bottom part.

16. The sound-producing device for a vehicle according to claim 8, comprising a fastening device that fixes the inlet to the vehicle body bottom part.

* * * * *